Aug. 17, 1926. Re. 16,403

F. L. JACOBS

METAL LADDER

Original Filed May 8, 1922

INVENTOR
Fredrick L. Jacobs
BY
M. Lee Helm
ATTORNEY

Reissued Aug. 17, 1926. Re. 16,403

UNITED STATES PATENT OFFICE.

FREDRICK L. JACOBS, OF NEWARK, NEW JERSEY.

METAL LADDER.

Original No. 1,575,208, dated March 2, 1926, Serial No. 559,256, filed May 8, 1922. Application for reissue filed June 3, 1926. Serial No. 113,585.

This invention relates to ladders and more particularly relates to ladders of metallic construction.

It is the object of the invention to provide a metal ladder of very light yet strong construction, having a novel structural formation and union between its rungs and the tie connections between the uprights or side rails of the ladder.

In attaining this object, the invention contemplates the use of metal tubing to form both the rungs and side rails, and the provision of tie rods passing through certain of the rungs, and having headed extremities engaging in recesses formed by indenting the side rails, the bosses formed by the indentations being utilized to support and reinforce the rungs by entering the ends thereof.

In the accompanying drawing.

Figure 1:
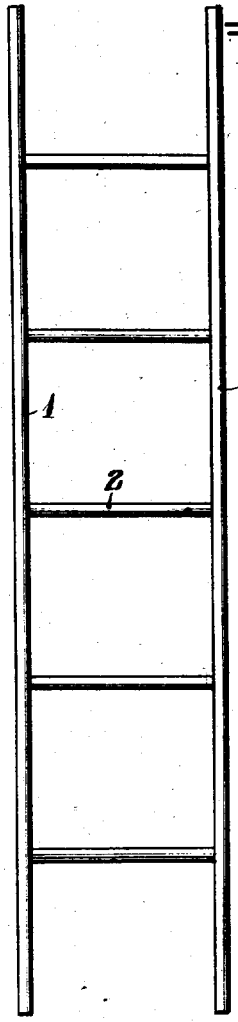
Figure 1 is a front view of the improved ladder.
Figure 2:
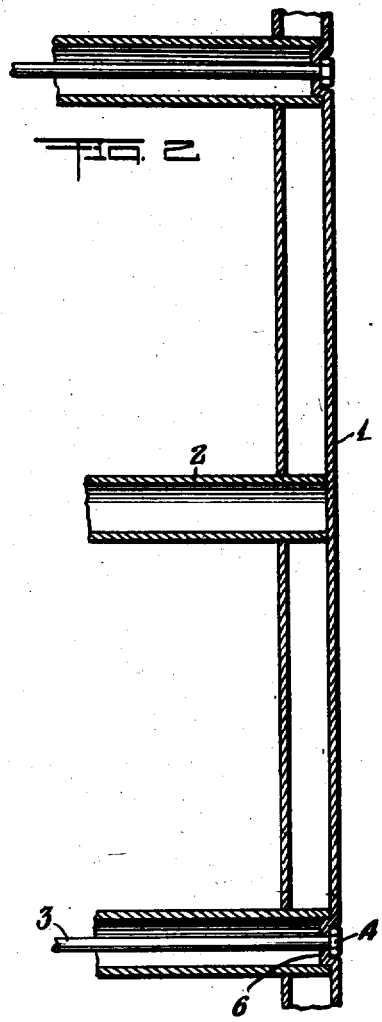
Figure 2 is an enlarged longitudinal section of a portion of the ladder.
Figure 3:
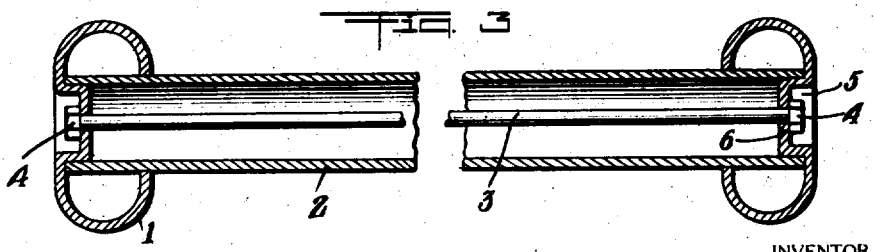
Figure 3 is a cross section on a plane intersecting one of the rungs.

In these views the reference character 1 designates the uprights or side rails, and 2 the rungs of the ladder, said parts being formed of steel tubing, preferably seamless. It is preferred to employ rungs of circular cross section and side rails of a cross section elongated transversely of the rungs. As shown, the front and rear faces of the side rails are rounded, while the inner and outer faces thereof are flat. Thus the side rails present smooth continuous surfaces for engagement by the hands of a person using the ladder. The rungs 2 are passed snugly through openings in the inner walls of the side rails and abut interiorly against the outer walls thereof. Through certain of said rungs, for example alternate ones, tie rods 3 are passed, said rods having terminal heads 4, one of which may be a nut, clamping against the outer faces of the side rails. It is undesirable to so expose said nuts that they may encounter the hands of a person using the ladder. The invention avoids such exposure by indenting the outer walls of the side rails in registration with such of the rungs as enclose tie rods, and locating the heads 4 within the indentations 5. Such location of said heads not only avoids obstructing the exterior faces of the side rails but to some extent houses said heads within the side rails so as to afford some protection against moisture and consequent corrosion.

The interior bosses 6, which are produced by the indentations 5, are utilized to reinforce the extremities of the rungs, said bosses being preferably proportioned to snugly fit into said extremities. Thus the load upon any of the rungs enclosing the tie rods is distributed to both the inner and outer walls of the side rails.

The described location of the tie members within certain of the rungs is further advantageous in that concealment of the tie members is thus effected, so that the latter detract nothing from the appearance of the ladder. Also this location prevents improper use of the tie members as foot rests. It is a desirable feature of the described construction that it permits of a very rapid and secure assembly of the parts and produces a comparatively light and strong ladder having a flush and smooth exterior.

What I claim is:

In a ladder, a tubular side rail having opposite wall portions with an opening in one of said portions and a boss in the other extending toward said opening and forming an indentation exteriorly of the rail, a tubular rung passing through said opening and contiguous to said boss, and a tie member extending within the rung and having an enlargement within said indentation.

In testimony whereof, I have signed this specification.

FREDRICK L. JACOBS.